United States Patent
Tores

(10) Patent No.: US 7,681,473 B2
(45) Date of Patent: Mar. 23, 2010

(54) ROTATIONAL MOVEMENT TRANSMISSION DEVICE COMPRISING A CASING FORMING A WINDING PATH FOR A FLEXIBLE SHAFT

(75) Inventor: Denis Tores, Vaux le Penil (FR)

(73) Assignee: Inderflex-Technoflex, Le Chatelet en Brie (FR)

( * ) Notice: Subject to any disclaimer, the term of this patent is extended or adjusted under 35 U.S.C. 154(b) by 1067 days.

(21) Appl. No.: 11/011,625

(22) Filed: Dec. 14, 2004

(65) Prior Publication Data

US 2005/0173960 A1   Aug. 11, 2005

(30) Foreign Application Priority Data

Dec. 17, 2003   (FR) .................................. 03 51098

(51) Int. Cl.
*G05G 1/08* (2006.01)
(52) U.S. Cl. ....................................................... 74/504
(58) Field of Classification Search ................ 74/500.5, 74/502, 502.5, 502.6, 503, 504; 464/52, 464/53, 180, 181
See application file for complete search history.

(56) References Cited

U.S. PATENT DOCUMENTS

| | | | |
|---|---|---|---|
| 3,443,307 A * | 5/1969 | Horst et al. ................. 29/527.2 |
| 3,581,523 A * | 6/1971 | Bartholomew ............... 464/52 |
| 3,812,738 A * | 5/1974 | Courtot ...................... 74/502.5 |
| 3,837,364 A | 9/1974 | Jenner | |
| 4,915,340 A * | 4/1990 | Nawa et al. ................. 248/429 |
| 5,931,736 A * | 8/1999 | Scherer et al. ................ 464/52 |
| 6,038,819 A * | 3/2000 | Klein ......................... 49/362 |
| 6,695,275 B2* | 2/2004 | Schuler et al. ............. 248/424 |
| 7,080,869 B2* | 7/2006 | Denis ......................... 296/63 |

FOREIGN PATENT DOCUMENTS

| | | |
|---|---|---|
| DE | 4035231 A1 * | 5/1992 |
| DE | 200 14 561 U1 | 12/2000 |
| DE | 202 16 127 U1 | 4/2003 |

OTHER PUBLICATIONS

Search Report of FA 645,157, FR 0351098 dated Jul. 21, 2004, 2 pages.

* cited by examiner

*Primary Examiner*—Vicky A Johnson
(74) *Attorney, Agent, or Firm*—Harness, Dickey & Pierce, P.L.C.

(57) ABSTRACT

The invention concerns a rotational movement transmission device comprising a flexible shaft and a casing inside which the shaft is housed, said casing being formed from a hollow body of plastic material whose internal diameter is arranged to allow the rotation of said shaft inside said casing, the wall of the body having a variable thickness so that at least part of the casing has an internal surface comprising corrugations extending longitudinally. The invention also concerns an adjustment system for a motor vehicle seat comprising such a transmission device.

25 Claims, 3 Drawing Sheets

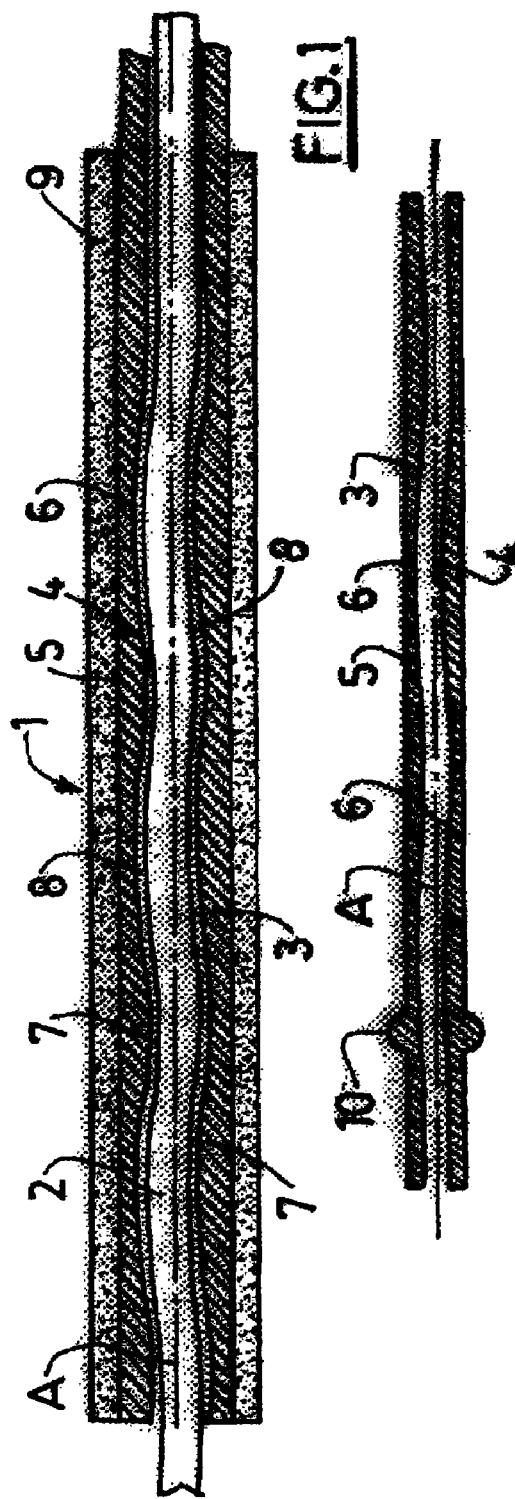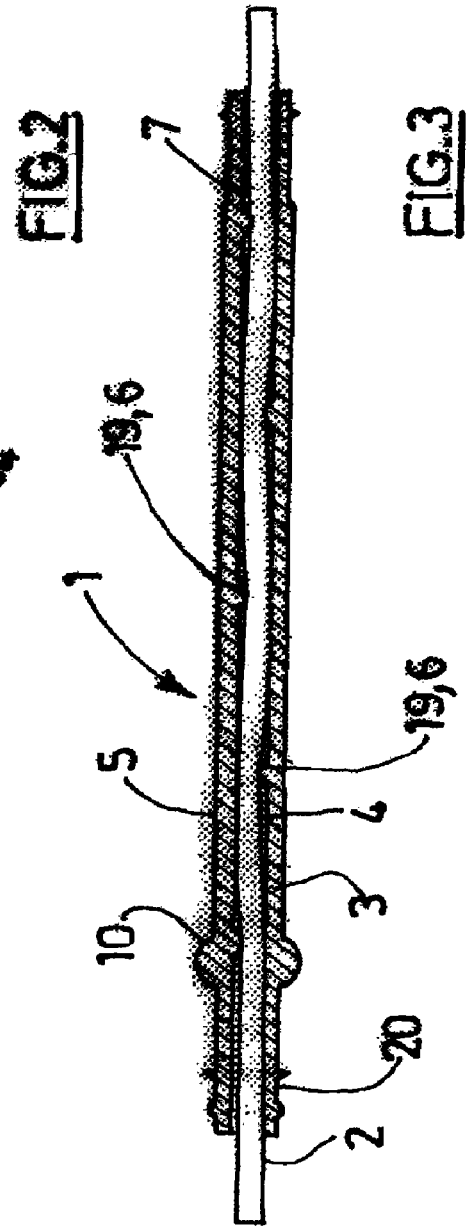

ROTATIONAL MOVEMENT TRANSMISSION DEVICE COMPRISING A CASING FORMING A WINDING PATH FOR A FLEXIBLE SHAFT

CROSS-REFERENCE TO RELATED APPLICATIONS

This application is claiming priority to French Application No. 0351098, filed Dec. 17, 2003, which is incorporated by reference herein.

BACKGROUND AND SUMMARY OF THE INVENTION

The invention concerns a rotational movement transmission device and an adjustment system for a motor vehicle seat comprising such a device.

Rotational transmission devices are known which comprise a flexible shaft and a casing inside which the shaft is housed. In these transmission devices, in particular for motor vehicle seat adjustment, the speeds of rotation of the shaft in the casing are greater than 2000 revs/minute, conventionally of the order of 3000 revs/minute. In order to allow rotation at such speeds, a gap of a few tenths of a millimeter is necessary between the shaft and the casing. But, during rotation, this gap leads to the appearance of small-amplitude vibrations which propagate along the shaft and cause unpleasant noise and feeling to the touch.

In order to solve this vibration problem, the document JP 07 310 730 proposes a rotational transmission device whose casing has at least one deformation in the form of a constriction, that is to say a local reduction in the diameter of the casing. This is because this constriction, by causing a gripping contact between the shaft and the casing, makes it possible to limit the vibrations. However, this contact creates considerable friction between the shaft and the casing, which requires the motor torque to be increased to obtain a speed of rotation of the shaft sufficient for the envisaged application. Moreover, this friction leads to premature wear of the casing at the deformation.

The invention aims to overcome these drawbacks by proposing a rotational movement transmission device whose casing has permanent deformations which are arranged to limit the vibrations without reducing the internal diameter of the casing. To that end and according to a first aspect, the invention concerns a rotational movement transmission device comprising a flexible shaft and a casing inside which the shaft is housed, said casing being formed from a hollow body of plastic material whose internal diameter is arranged to allow the rotation of said shaft inside said casing, the wall of the body having a variable thickness so that part of the casing has an internal surface comprising corrugations extending longitudinally.

According to a second aspect, the invention concerns an adjustment system for a motor vehicle seat, comprising at least one adjustment runner mounted on the structure of the vehicle and adjustable means for fixing the seat on said runner, said system also comprising a drive motor having at least one revolving part, said adjustment system also comprising a transmission device as described above, which is disposed between the output of said drive motor and said fixing means, so as to move said fixing means along said adjustment runner in response to a rotation of said output. Other objects and advantages of the invention will emerge during the following description, given with reference to the accompanying drawings.

BRIEF DESCRIPTION OF THE DRAWINGS

FIG. 1 is a partial longitudinal sectional view of the casing of a transmission device according to the invention, said casing being housed in a tube of the device.

FIG. 2 is a partial longitudinal sectional view of the casing of FIG. 1 alone.

FIG. 3 is a partial longitudinal sectional view of the casing according to another embodiment, the shaft being housed in the casing.

DETAILED DESCRIPTION

Figure 4:
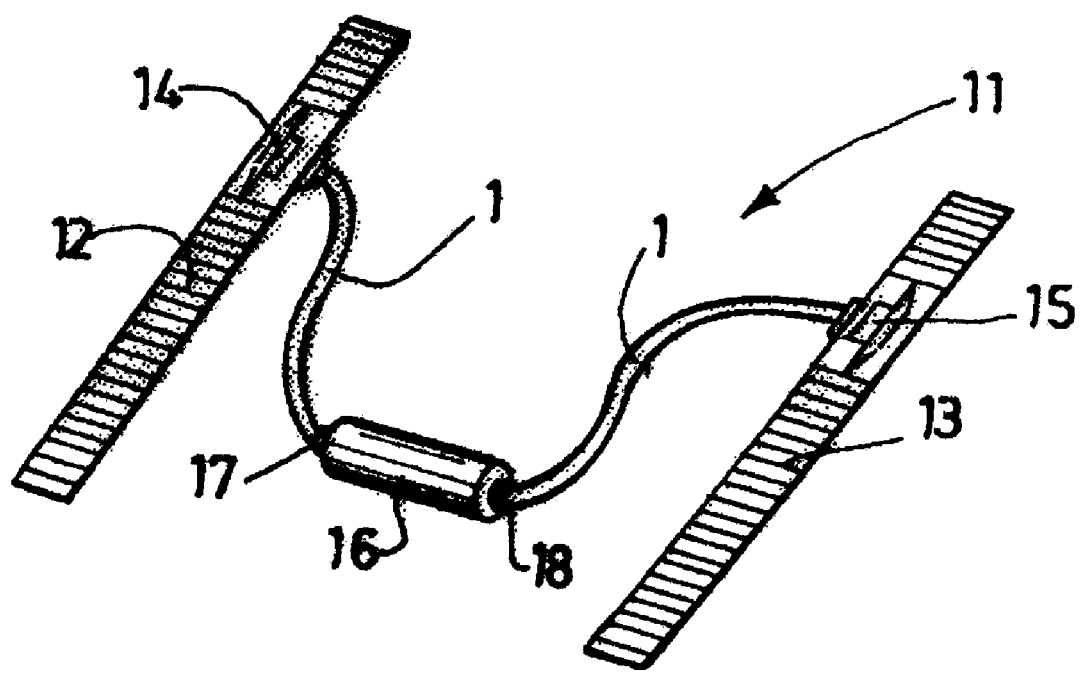
FIG. 4 is a perspective view of an adjustment system for the motor vehicle seat according to the invention.

As depicted in FIG. 1, a rotational movement transmission device 1 comprises a flexible shaft 2 and a casing 3. The shaft 2 is housed in the casing 3, the internal diameter of which is provided to allow the rotation of the shaft 2 in the casing 3. In the description, the word "longitudinal" is defined along the axis A of the casing 3 depicted in FIGS. 1 and 2. The speeds of rotation of the shaft 2 are conventionally approximately 3000 revs/minute. In order to allow rotation at this speed, a gap of a few tenths of a millimeter is provided between the shaft 2 and the casing 3.

The casing 3 is produced from plastic material, for example polyurethane. It can be produced by injection moulding of the plastic material around a pin. The casing 3 is formed from a hollow body and has an internal surface 4 and an external surface 5. Internal surface means the surface forming the wall of the hollow cylinder and therefore situated inside the casing 3.

The wall of the hollow body has a variable thickness so that the internal surface 4 comprises corrugations 6 extending longitudinally over at least part of the casing 3. This creates a slightly winding path inside the casing 3 with points of contact 7 between the casing 3 and the shaft 2 which are opposite with respect to the axis A of the casing and alternate either side of this axis, as depicted in FIG. 1. These points of contact 7 eliminate any possibility of the moving shaft 2 being set vibrating without however slowing it down. The motor torque can thus be similar to that used with non-deformed casings and the casing 3 does not have a tendency to premature wear at the deformations. Furthermore, the spaces left free between the casing 3 and the flexible shaft 2 can form a reserve of grease 8 for lubricating the shaft 2.

According to one implementation depicted in FIG. 3, the corrugations 6 are formed by projections 19 extending towards the inside of the casing 3 and distributed along at least part of the casing 3. As depicted in FIG. 3, the projections 19 allow a slightly winding path to be created inside the casing. The projections 19 can have a cross-section of any shape whatsoever, in particular chosen from amongst a triangle, part of a circle, part of a diamond, or part of a rectangle. The corrugations 6 are formed during the moulding of the casing by making provision that the pin around which the moulding is carried out is corrugated in an appropriate manner. According to one implementation, the corrugations 6 are provided in the end parts of the casing 3, the remainder of the casing having a substantially cylindrical internal surface as in the case of a non-deformed casing.

According to another implementation, particularly for casings of small length, for example a length between 5 and 10 cm, the entire internal surface 4 has corrugations 6 which extend along the whole of the casing. The corrugations 6 can be continuous or discontinuous.

According to the implementation depicted in FIGS. 1 and 2, the external surface 5 of the casing is substantially cylindrical. The casing then has a smooth external surface. This implementation is particularly adapted when the casing 3 goes inside a guidance tube 9 for the casing of the transmission device 1, as depicted in FIG. 1. This is because, in certain applications, provision is made that the casing 3 goes inside a rigid guidance tube 9 whose internal diameter is substantially equal to the external diameter of the casing 3. If the external surface 5 of the casing is also deformed, it may happen that the tube 9 "crushes" the deformations and prevents the formation of the winding path inside the casing 3, and this is why a substantially cylindrical external surface 5 may be provided.

According to one implementation, one only or both end parts of the casing 3 are housed in the tube 9. Provision can then be made that the casing comprises at least one area forming a limit stop 10, as depicted in FIG. 2. This area 10 extends projecting from the external surface 5. When the end part is inserted into the tube, an end part of the tube 9 comes into contact with the area forming a limit stop 10 so as to limit the length of casing introduced into the tube.

The corrugations 6 being implemented inside the casing 3, the external surface 5 can be adapted to allow the fixing of the casing 3 on a support by means of fixing means. Thus, the external surface 5 of the casing 3 can have variations in thickness so as to form areas 20 of association with external means of fixing the casing 3 on a support, as depicted in FIG. 3. The fixing means are for example clips, connectors, etc.

The flexible shaft can have a circumference machined so as to make the latter substantially smooth. In that way, a rotation with reduced friction of the shaft 2 in the casing 3 is provided. The flexible shaft 2 can for example conform to the implementation described in the document FR-03 03034. According to one implementation, the shaft 2 comprises at least one end part intended to be housed in a housing over a maximum length extending between the base and the free end of the end part, said end part having a spiral truncated pyramid geometry extending between the base and the free end. The shaft for example conforms to the implementation described in the document FR-03 51001.

The end part of the shaft 2 therefore has a cross-section which decreases up to its free end. This makes it possible to provide an association with the housing which is accurate and without a gap by inserting the end part of the shaft into the housing until the cross-section of the shaft is in contact against the internal walls of the housing. The end part being spiral, a clamping of the shaft 2 in the housing is provided when the latter is set rotating by interference of the edges of the truncated pyramid with the walls of the housing. Moreover, such a variable cross-section allows a shaft 2 to be adapted to different housing dimensions.

Figure 5:
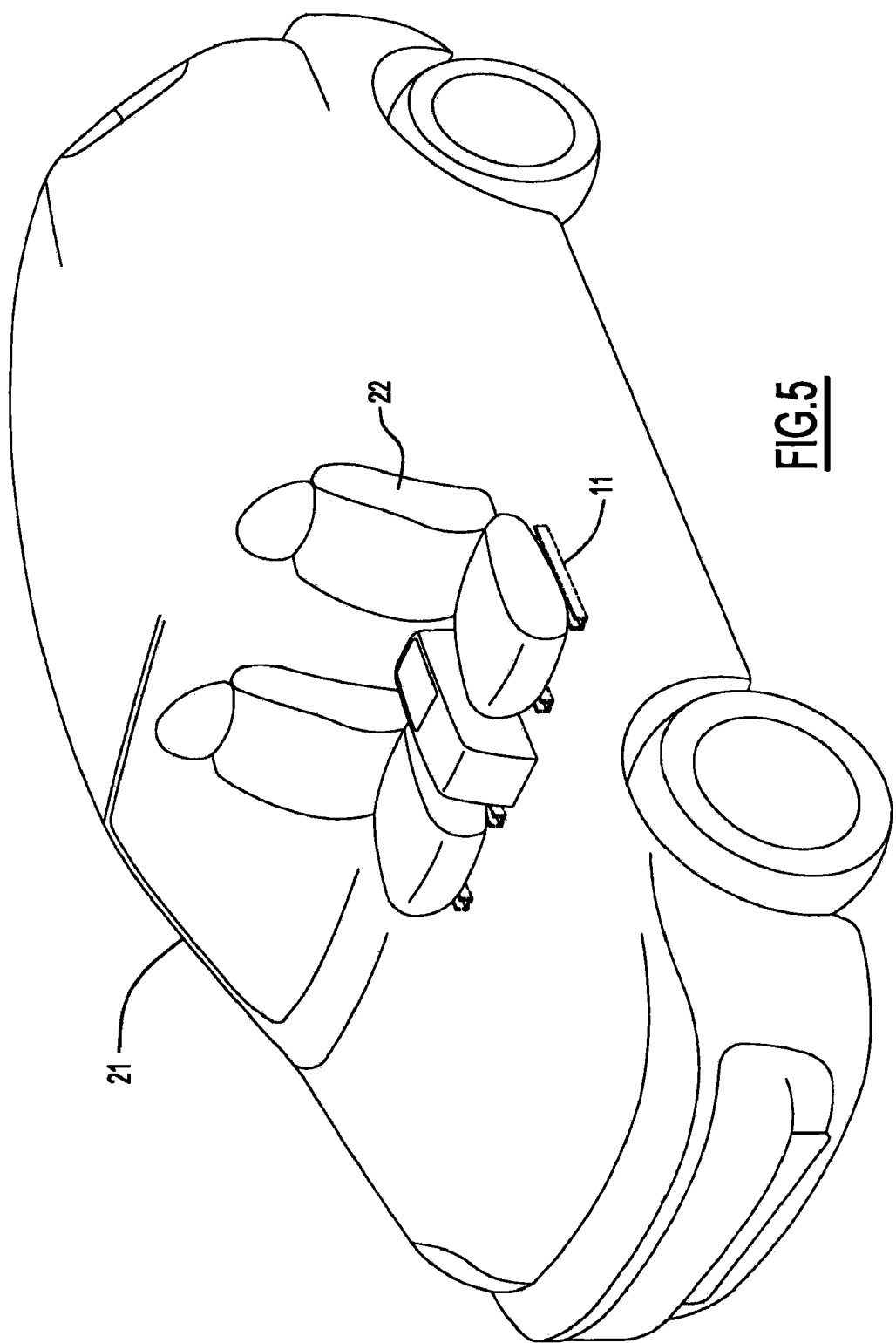
FIG. 5 is an exemplary vehicle having an adjustment system according to one example of the present teachings.

With reference to FIGS. 3, 4 and 5 a description is now given of an adjustment system for a motor vehicle seat 11 comprising a rotational movement transmission device 1 as described above. Such an adjustment system 11 comprises two runners 12 and 13 fixed by any suitable means on the structure, not depicted, of a motor vehicle 21. These runners have adjustment notches whose function will be described below. The runners 12 and 13 support the frame of a seat 22 of the vehicle 21, whose movement and fixing with respect to the runners are provided by adjustable means such as reduction gears 14 and 15 respectively provided with toothed wheels cooperating with the aforementioned notches of the runners 12 and 13.

An electric motor 16 is fixed to the structure of the vehicle or, in a variant, to the frame of the seat. This motor 16 has two revolving outputs 17 and 18. These outputs 17 and 18 are connected by rotational movement transmission devices 1 according to the invention to the reduction gears 14 and 15 respectively.

The transmission devices 1 are associated with the outputs of the motor and with the reduction gears by means of housings which receive the end parts of the flexible shafts 2. The association between an end part and a housing is implemented by pushing in the end part until the cross-section of this part is in contact with the internal walls of the housing. No gap then exists between the flexible shaft 2 and the housing which makes it possible to provide an efficient transmission of the rotational movements and reduces the noise created by the system 11.

The invention claimed is:

1. A rotational movement transmission device comprising a flexible shaft and a casing inside which the shaft rotates, the casing being formed from a hollow body of plastic material whose internal diameter is arranged to allow the rotation of the shaft inside a length of the casing, the wall of the body having a variable thickness so that at least part of the casing has an internal surface that is continuous and comprises corrugations extending longitudinally, wherein the internal diameter has a cylindrical cross-section along the length of the casing.

2. A transmission device according to claim 1, wherein at least part of the casing has a constant outside diameter.

3. A transmission device according to claim 1, wherein the casing defines end parts at opposite ends thereof and wherein one or both end parts of the casing have an internal surface comprising corrugations extending longitudinally.

4. A transmission device according to claim 1, wherein the whole of the casing has an internal surface comprising corrugations extending longitudinally.

5. A transmission device according to claim 1, further comprising a rigid tube having an internal diameter substantially equal to the external diameter of the casing, at least the end part being housed in the tube.

6. A transmission device according to claim 5, wherein an end part of the tube comes into contact with an area forming a limit stop.

7. A transmission device according to claim 1, wherein the casing comprises an area forming a limit stop, the area projecting from the external surface.

8. A transmission device according to claim 1, wherein the external surface of the casing has variations in thickness so as to form areas of association with external means of fixing the casing on a support.

9. A transmission device according to claim 1, wherein the shaft comprises at least one end part having a spiral truncated pyramid geometry.

10. A transmission device according to claim 1, wherein the flexible shaft is machined so as to have a substantially uniform external surface.

11. The transmission device of claim 1 wherein the casing has an external diameter that has a cylindrical cross-section along the length of the casing wherein the cylindrical cross-sections of the internal and external diameters and the variable thickness of the wall collectively provide a winding path in which the flexible shaft is positioned along.

12. A motor vehicle seat adjustment system comprising:
at least one vehicle seat adjustment runner;
an actuator having at least one revolving part; and
a transmission causing movement along said adjustment runner in response to operation of said actuator, said transmission including a rotating shaft inside a length of casing, said casing having an external surface and an internal surface, both having cylindrical cross-sections along said length, wherein said casing has a wall thickness that varies along said length providing a winding path for said rotating shaft to limit vibrations of said shaft during its rotation.

13. The system according to claim 12, wherein said shaft is flexible and said casing is a hollow plastic material whose internal diameter is arranged to allow the rotation of said shaft inside said casing.

14. The system according to claim 12, wherein at least one end portion of said casing has an internal surface comprising corrugations extending longitudinally.

15. The system according to claim 12, wherein the whole of said casing has an internal surface comprising corrugations, and said actuator is an electromagnetic device.

16. The system according to claim 12, wherein at least one end of said shaft comprises a spiral truncated pyramid geometry.

17. A rotational movement transmission device comprising:
a shaft; and
a casing that houses the shaft which operably rotates within a length of the casing, the casing having a longitudinal centerline axis, the casing having an internal surface, an external surface and differing wall thicknesses therebetween, the internal surface having a cylindrical cross-section along the length;
the thicker wall sections of the casing internally projecting adjacent the shaft to deter shaft vibrations and the thicker wall sections of the casing not internally projecting past the centerline axis of the casing.

18. The transmission device of claim 17, further comprising an electric motor operably revolving an output which rotates the shaft.

19. The transmission device of claim 17, further comprising a vehicular seat and runner assembly operably moving in response to rotation of the shaft within the casing.

20. The transmission device of claim 17, wherein the shaft and casing are both flexible.

21. The transmission device of claim 17, wherein the differing wall thicknesses of the casing are corrugations inwardly projecting from the casing, the external surface of the casing being substantially cylindrical.

22. The transmission device of claim 17, wherein sections of the casing having the differing wall thicknesses are separated by longer longitudinal sections of the casing wherein the wall thickness is substantially constant.

23. The transmission device of claim 17, further comprising at least one formation laterally extending as an integrally single piece from the external surface of the casing, which is otherwise substantially cylindrical and smooth.

24. A rotational movement transmission device comprising:
a shaft;
a casing that houses the shaft which operably rotates within a length of the casing, the casing having a longitudinal centerline axis, the casing having an internal surface, an external surface and differing wall thicknesses therebetween, the differing wall thickness providing internally projecting portions adjacent the shaft to deter shaft vibrations, the projecting portions not internally projecting past the centerline axis of the casing; and
wherein sections of the casing having the projecting portions are separated by longer longitudinal sections of the casing wherein the wall thickness is substantially constant, the projections being alternately formed on diametrically opposite sides of the internal surface along the length creating a winding path for the shaft inside the casing.

25. The transmission device of claim 24 wherein the projections have a cross-section having a semi-circular shape.

* * * * *